May 1, 1951 H. C. WEIMAR 2,550,925
MEANS FOR BLOCKING THE BORE OF A LONG HOLLOW PISTON ROD
Filed June 10, 1948
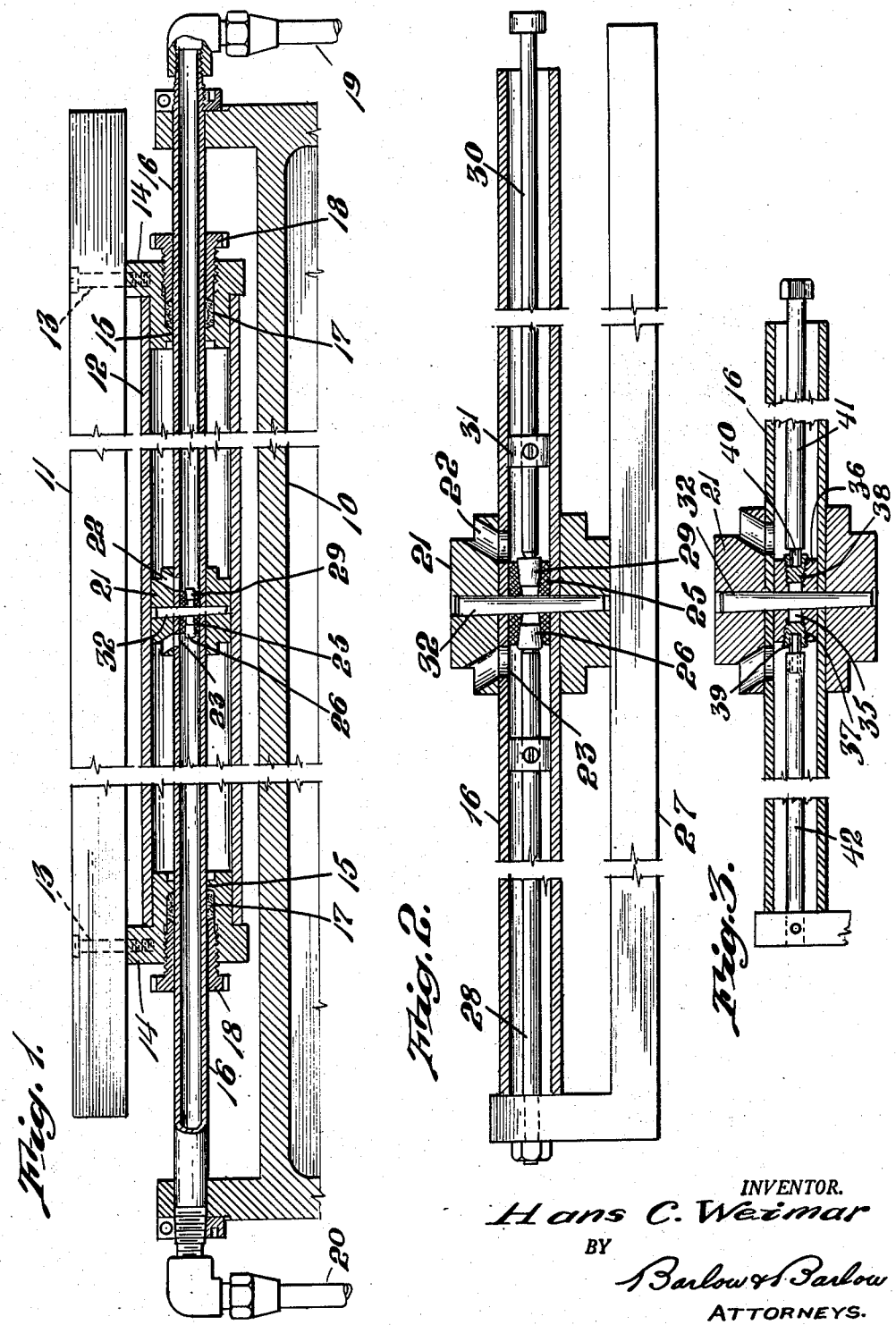
INVENTOR.
Hans C. Weimar
BY
Barlow & Barlow
ATTORNEYS.

Patented May 1, 1951

2,550,925

UNITED STATES PATENT OFFICE 2,550,925

MEANS FOR BLOCKING THE BORE OF A LONG HOLLOW PISTON ROD

Hans C. Weimar, Providence, R. I., assignor to Brown & Sharpe Manufacturing Company, a corporation of Rhode Island Application June 10, 1948, Serial No. 32,236

9 Claims. (Cl. 309—4)

This invention relates to a means for blocking a piston rod used when hydraulically reciprocating different parts of machinery such, for instance, as in machine tools, one example being the reciprocation of a sliding table.

In hydraulic means for reciprocating parts of machinery such as a table, it is usual to feed the actuating liquid through a hollow piston rod by movement of the liquid in one direction through half of the rod, and movement of the liquid in the other direction through the other half of the rod, and vice versa. This rod is often separate and secured to the piston. Various means to secure the rod to the piston have been provided. Or in a case where the rod extends completely through the piston, means have been used for blocking the passage through the rod so as to divide it into two parts. In the case where two hollow rods are used and secured to the piston such as by threading, there is a difficult problem of aligning the piston rods. Such double rods have been blocked by a pair of plugs which were designed to fit properly the bore of the rod, but unless there is an expensive machining of the bore of the rod, the plugs will not fit properly. In some cases it has been attempted to utilize a piston and rod all as one piece, but in this situation a very expensive drilling is required.

One of the objects of this invention is to provide a piston with a piston rod formed from stock obtained by piercing and rolling, with no subsequent machining, and yet one which may be satisfactory in use.

Another object of this invention is to provide a simple method for locating some means to divide the bore in a long piston rod.

Another object of the invention is to provide an arrangement so that the bore dividing means may be easily positioned and after positioning may be held in place by expansion of the metal.

With these and other objects in view, the invention consists of certain novel features of construction as will be more fully described and particularly pointed out in the appended claims.

In the accompanying drawings:

Figure 1 is a sectional view illustrating a fragmental portion of a machine tool with the invention utilized in the means for reciprocating a sliding table;

Figure 2 is a sectional view illustrating a method of securing the means for dividing the bore within the piston rod; and Figure 3 is a sectional view illustrating a modified means and method of providing the blocking of the bore of the piston rod.

In proceeding with this invention the piston is provided with an opening through it, and a long piston rod of a sufficient length to extend the required distance each side of the piston is passed through this opening. A sleeve which freely fits into the bore of the piston rod has inserted in either end thereof tapered plugs, the assembly being then positioned at the location of the piston in the piston rod. The assembly is then placed on a fixture which has a positioning rod to engage one plug and then a second plug is driven toward the first plug, which serves to drive both plugs into the sleeve and expand the sleeve to engage tightly the bore of the piston rod and prevent any movement of fluid past it and expand the piston rod so as to tightly engage the piston. A pin then secures the piston to the piston rod and also passes through the sleeve between the plugs to assist in holding the parts assembled.

With reference to the drawings, 10 designates the bed of a machine tool which is equipped with a sliding table 11, and a cylinder 12 is secured to the table by screws 13 entering the heads 14 of the cylinder. These heads are provided with openings 15 for the passage therethrough of a hollow piston rod 16, there being a gland 17 with gland nut 18 threaded into each head 14 so as to prevent escape of liquid from the cylinder. The hollow piston rod 16 is fixed and has the usual lead-ins or conduits at 19 and 20 at the opposite ends thereof. A piston 21 is secured to the piston rod 16 at substantially the center thereof and there are provided openings 22 and 23 for the movement of fluid through the piston rod and into the cylinder for the actuation of the cylinder and the table connected thereto. There must be some division provided in the single long continuous bore of the piston rod 16 which extends from end to end through the cylinder for the separation of the liquid entering through pipe 19 and exhausting through pipe 20 or vice versa, and it is this dividing or blocking means between the openings 22 and 23 which is primarily the subject of this invention.

In order to provide this blocking means prior to the positioning of the piston and the piston rod in the cylinder 12, the piston, which has an opening therethrough to receive the piston rod, is positioned on the piston rod, tapered plugs 26 and 29 are positioned in sleeve 25 and then sleeve 25 is located in the bore of the hollow piston rod. This assembly is then positioned upon a fixture 27, as shown in Figure 2, with the piston resting upon the bed thereof with a positioning rod 28 extending into the bore of the piston rod 16 to engage the plug 26. The duplicate tapered plug 29 is then engaged by a driving rod 30 which is guided in position by a collar 31, hammer blows are given the driving rod to drive the plug 29 and the plug 26 into the sleeve from opposite ends so as to expand the sleeve to engage tightly the bore of the piston rod 16 and prevent the movement of liquid from one end of the rod to the other; also the rod is expanded to tightly engage the piston. A locking pin 32 is then placed through the piston, piston rod, and sleeve between the plugs so as to hold the piston and the piston rod against axial movement as well as also to assist in holding the sleeve against axial movement along the piston rod.

In some cases instead of driving the plugs 26 and 29 into position, the ends of the bore 35 of the sleeve 36, Figure 3, are threaded, and the tapered plugs 37 and 38 are threaded with axial angular recesses to receive the angular studs 39 and 40 for turning the plugs to expand the sleeve 36 to snugly engage the rod 16 and in turn expand the rod to snugly engage the piston 21. Turning of the plugs is accomplished by the rods 41 and 42 engaging the studs to transmit movement thereto. The pin 32 may be positioned as heretofore set forth.

It will be apparent that if liquid is forced through the conduit 19 and through the piston rod 16 so that it will pass through the opening 22 into the cylinder, the cylinder will be moved to the right while at the same time exhausting the liquid at the other side of the piston through the conduits 23 and 20. If it is desired that the table be moved in the opposite direction, liquid will be forced through the conduit 20 out through conduit 23 and liquid will exhaust through conduits 22 and 19. The above provides a very simple and effective arrangement for providing a means for dividing or blocking the bore through the piston rod; also an arrangement so that a single one-piece piston rod may be easily assembled with a piston, reducing by this construction, the manufacturing procedure and simplifying the parts involved.

I claim:
1. Means for blocking the bore of a piston rod having a bore therethrough of a length many times its diameter comprising a sleeve of relatively short axial extent located in said bore substantially midway of the ends thereof, a tapered plug in an end of said sleeve, said sleeve being of a diametrical size at the location of said plug to engage snugly the bore of the rod.

2. Means for blocking the bore of a piston rod having a long bore therethrough of a length many times its diameter comprising a sleeve of relatively short axial extent located in said bore substantially midway of the ends thereof, with a portion of a size less than the diameter of the bore, a tapered plug in an end of said sleeve, said sleeve being larger in diametrical size at the location of said plug to engage snugly the bore of the rod.

3. Means as in claim 1 wherein plugs are present in the opposite ends of the sleeve.

4. Means as in claim 2 wherein plugs are present in the opposite ends of the sleeve.

5. Means as in claim 4 wherein a pin extends through the rod and sleeve between said plugs.

6. Means as in claim 2 wherein a pin extends through the rod and sleeve.

7. A piston, a one-piece piston rod extending through the piston and itself having a bore of a length many times its diameter, a sleeve of a relatively short axial extent in the bore of said rod substantially midway of the ends thereof, a tapered plug in one end of said sleeve, said sleeve being of a diametrical size at the location of said plug to engage snugly said bore.

8. A piston, a one-piece piston rod extending through the piston and itself having a bore of a length many times its diameter, a sleeve of a relatively short axial extent in the bore of said rod substantially midway of the ends thereof, tapered plugs in the opposite ends of said sleeve, said sleeve being of a diametrical size at the location of said plugs to engage snugly said bore, and said piston being of a size at the location of said plugs to engage snugly said rod.

9. A piston as in claim 7 wherein a pin extends through the piston rod and sleeve to prevent relative axial movement.

HANS C. WEIMAR.

REFERENCES CITED

The following references are of record in the file of this patent:

UNITED STATES PATENTS

| Number | Name | Date |
| --- | --- | --- |
| 188,625 | Hand | Mar. 20, 1877 |
| 245,310 | Morison | Aug. 9, 1881 |
| 877,635 | Dietz | Jan. 28, 1909 |
| 1,330,913 | Short | Feb. 17, 1920 |
| 1,383,002 | McIlvried | June 28, 1921 |
| 1,631,359 | Brown | June 7, 1927 |
| 1,670,564 | Breer | May 22, 1928 |
| 1,992,631 | Picquerez | Feb. 26, 1935 |
| 2,107,315 | Wainwright | Feb. 8, 1938 |

FOREIGN PATENTS

| Number | Country | Date |
| --- | --- | --- |
| 20,473 | Great Britain | Oct. 30, 1893 |